(12) United States Patent
Gu et al.

(10) Patent No.: US 12,024,135 B2
(45) Date of Patent: Jul. 2, 2024

(54) DEVICE OF UNMANNED VEHICLE WITH SENSOR DEVICE AND CLEANING MECHANISM

(71) Applicant: BEIJING TUSEN WEILAI TECHNOLOGY CO., LTD, Beijing (CN)

(72) Inventors: Xiaoping Gu, Beijing (CN); Jie Sun, Beijing (CN)

(73) Assignee: BEIJING TUSEN WEILAI TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/325,864

(22) Filed: May 30, 2023

(65) Prior Publication Data

US 2023/0303037 A1 Sep. 28, 2023

Related U.S. Application Data

(63) Continuation of application No. 17/379,554, filed on Jul. 19, 2021, now Pat. No. 11,667,269, which is a continuation of application No. 16/250,994, filed on Jan. 17, 2019, now Pat. No. 11,066,048.

(30) Foreign Application Priority Data

Jan. 25, 2018 (CN) .......................... 201820132177.0

(51) Int. Cl.
*B60S 1/52* (2006.01)
*B60S 1/48* (2006.01)
*B60S 1/50* (2006.01)
*B60S 1/56* (2006.01)
*G02B 27/00* (2006.01)
*H04N 5/00* (2011.01)

(52) U.S. Cl.
CPC ................. *B60S 1/56* (2013.01); *B60S 1/488* (2013.01); *B60S 1/50* (2013.01); *B60S 1/52* (2013.01); *G02B 27/00* (2013.01); *H04N 5/00* (2013.01); *B60S 1/566* (2013.01)

(58) Field of Classification Search
CPC .............. B60S 1/50; B60S 1/488; B60S 1/58
See application file for complete search history.

(56) References Cited

U.S. PATENT DOCUMENTS

| | | | |
|---|---|---|---|
| 6,227,462 B1 * | 5/2001 | Chen | B60S 1/52 239/284.1 |
| 11,066,048 B2 | 7/2021 | Gu et al. | |
| 2019/0256055 A1 | 8/2019 | Gu et al. | |
| 2021/0347335 A1 | 11/2021 | Gu et al. | |

* cited by examiner

*Primary Examiner* — Michael D Jennings
(74) *Attorney, Agent, or Firm* — Perkins Coie LLP

(57) ABSTRACT

The present disclosure relates to vehicle technology, and more particularly, to an unmanned vehicle and its sensor device and cleaning mechanism. The cleaning mechanism includes: a housing, a cleaning element, a driving component transmissively connected to the cleaning element and a control unit installed within a receiving cavity. The housing has a light transmissive element provided on a side surface thereof. The cleaning element is pivotable about one end thereof and mounted to the housing. The cleaning element, when pivoting, frictionally interacts with a surface of the light transmissive element that is away from the receiving cavity to clean the light transmissive element. The control unit is communicatively connected to the driving component for controlling the driving component.

20 Claims, 2 Drawing Sheets

DEVICE OF UNMANNED VEHICLE WITH SENSOR DEVICE AND CLEANING MECHANISM

CROSS-REFERENCE TO RELATED APPLICATIONS

This application is a continuation of U.S. patent application Ser. No. 17/379,554, filed on Jul. 19, 2021, which is a continuation of U.S. patent application Ser. No. 16/250,994, filed Jan. 17, 2019, which claims the priority to and the benefits of Chinese Patent Application No. 201820132177.0, filed Jan. 25, 2018. The aforementioned patent applications are incorporated by reference herein in their entireties.

TECHNICAL FIELD

The present disclosure relates to vehicle technology, and more particularly, to an unmanned vehicle and its sensor device and cleaning mechanism.

BACKGROUND

With the rapid development of computers, sensors and artificial intelligence technology, unmanned vehicles have gradually become a hot topic of research and development. By using a vehicle-mounted sensing system, an unmanned vehicle senses a road environment, automatically plans a driving route and controls the vehicle to reach a predetermined destination. Therefore, an unmanned vehicle is provided with various sensor devices for image capturing, measurement, navigation, and the like.

SUMMARY

Some embodiments of the present disclosure provides an unmanned vehicle and its sensor device and cleaning mechanism.

According to some embodiments of the present disclosure, a cleaning mechanism is provided. The cleaning mechanism includes: a housing having a receiving cavity formed therein and a light transmissive element provided on a side surface thereof for enabling light from outside the housing to enter the receiving cavity; a cleaning element pivotable about one end thereof and mounted to the housing, the cleaning element, when pivoting, frictionally interacting with a surface of the light transmissive element that is away from the receiving cavity to clean the light transmissive element; a driving component transmissively connected to the cleaning element for driving the cleaning element; and a control unit installed within the receiving cavity and communicatively connected to the driving component for controlling the driving component.

In some embodiments, the cleaning mechanism may further include at least one jet head mounted to the housing and corresponding to the light transmissive element, each jet head having a jet hole facing the light transmissive element. The jet head is configured to jet a liquid and/or a gas onto the surface of the light transmissive element that is away from the receiving cavity to clean the light transmissive element.

In some embodiments, the cleaning mechanism may further include a liquid storage container and a gas storage container connected to the at least one jet head.

In some embodiments, the at least one jet head may be connected to the liquid storage container through a first pipe and a first solenoid valve provided on the first pipe. The at least one jet head may be connected to the gas storage container through a second pipe and a second solenoid valve provided on the second pipe. The control unit may be communicatively connected to the first solenoid valve and the second solenoid valve for controlling on/off of the first solenoid valve and the second solenoid valve.

In some embodiments, the first pipe may be further provided with a first check valve, and the second pipe may be provided with a second check valve.

In some embodiments, the cleaning mechanism may further include: a water pump provided on the first pipe between the first solenoid valve and the liquid storage container, and a gas pump connected to the gas storage container. The control unit may be communicatively connected to the water pump and the gas pump for controlling the water pump and the gas pump.

In some embodiments, the cleaning mechanism may further include: an electric heating film mounted on a surface of the light transmissive element, and a gas valve mounted to the housing. The control unit may be communicatively connected to the electric heating film for controlling the electric heating film to heat the light transmissive element.

According to some embodiments of the present disclosure, a sensor device is also provided. The sensor device includes the cleaning mechanism according to any of the above solutions, and a sensor provided within the housing of the cleaning mechanism.

In some embodiments, the sensor may be a camera.

According to some embodiments of the present disclosure, an unmanned vehicle is further provided. The unmanned vehicle includes at least one sensor device according to any of the above solutions.

The present disclosure provides an unmanned vehicle and its sensor device and cleaning mechanism. In the cleaning mechanism, a driving component drives a cleaning element to pivot, such that the cleaning element frictionally interacts with a light transmissive element to clean the light transmissive element. As such, the light transmissive element may always be in a normal, light transmissive state, such that signals, such as rays, light waves or electromagnetic waves, emitted from sensors may pass through the light transmissive element normally and thus the sensors may perform their functions, such as image capturing, navigation and measurement, normally. In this way, the problem in the related art that a sensor may not function normally due to contamination of a sensor device by dirt such as dust may be solved.

DETAILED DESCRIPTION OF THE EMBODIMENTS

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The embodiments of the present disclosure provide an unmanned vehicle and its sensor device and cleaning mechanism. The unmanned vehicle has some sensor devices providing functions such as image capturing, positioning, navigation and measurement. A sensor device includes a cleaning mechanism and a sensor provided within the cleaning mechanism. The sensor may be an image capturing sensor such as an infrared camera or a high definition camera, or any of various sensors such as a laser radar, a millimeter wave radar or a positioning sensor. The cleaning mechanism may clean a light transmissive element using a cleaning element, so as to solve the problem in the related art that a sensor may not function normally due to contamination of a sensor device by dirt such as dust.

Figure 1:
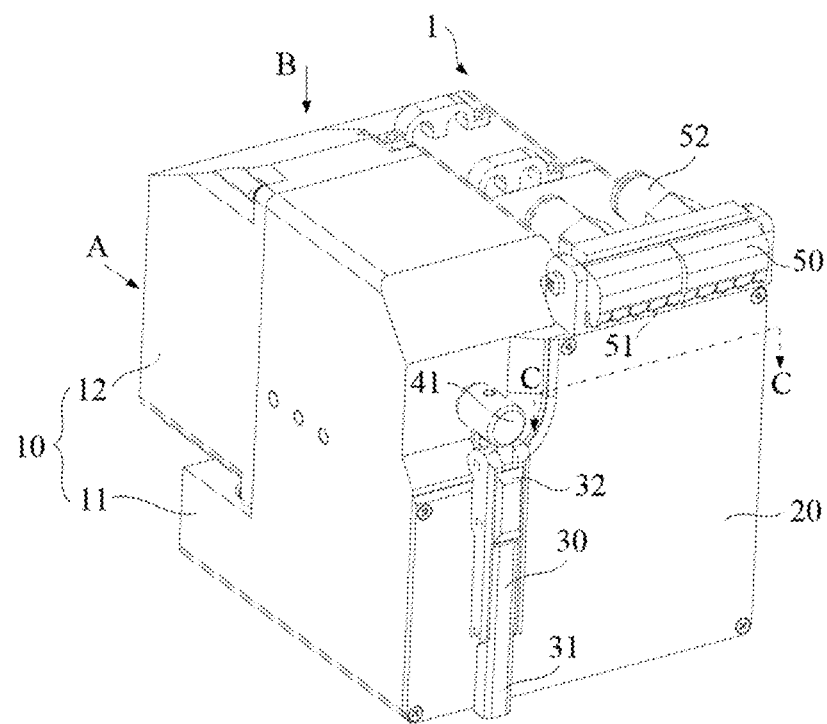
FIG. 1 is a schematic diagram showing a stereoscopic structure of a sensor device according to some embodiments of the present disclosure.
Figure 2:
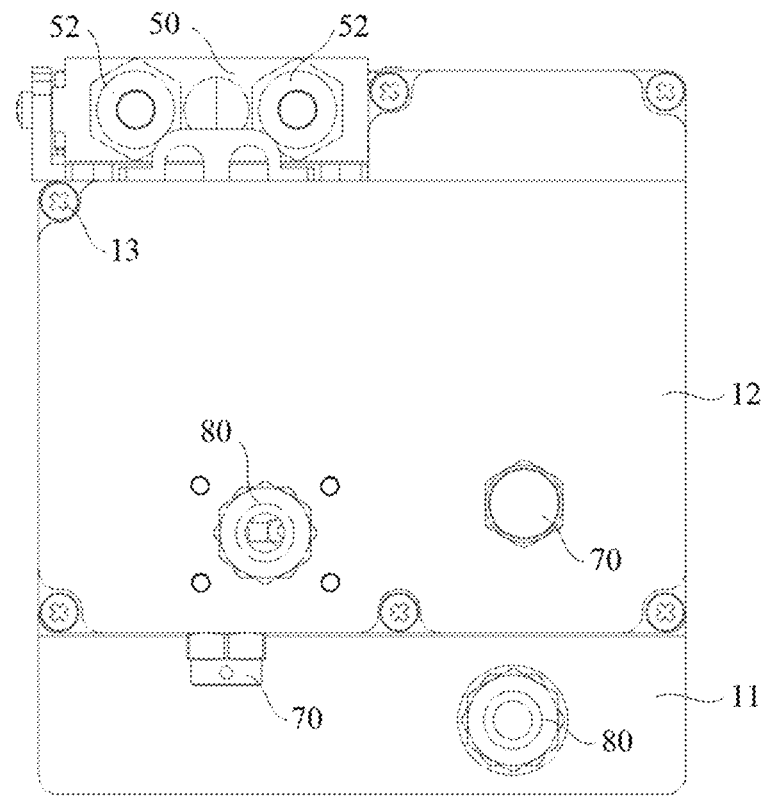
FIG. 2 is a schematic diagram showing a structure of the sensor device in FIG. 1 in direction A.
Figure 3:
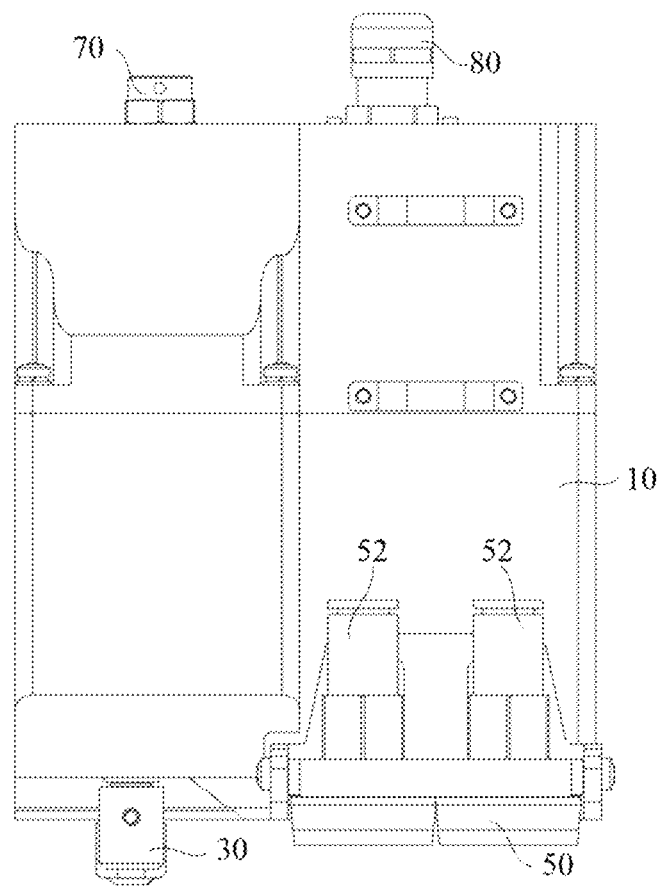
FIG. 3 is a schematic diagram showing a structure of the sensor device in FIG. 1 in direction B.

Here, referring to FIGS. 1, 2 and 3, according to some embodiments of the present disclosure, a cleaning mechanism is provided.

The cleaning mechanism includes a housing 10 having a receiving cavity formed therein and a light transmissive element 20 provided on a side surface thereof for enabling light from outside the housing 10 to enter the receiving cavity. The housing 10 may have a one-piece structure or have individual parts. The housing 10 having the structure as shown in FIGS. 1 and 2 includes a front housing 11 and a rear housing 12, which may be fixedly coupled together by a fastener such as a screw 13. The receiving cavity is formed between the front housing 11 and the rear housing 12. The light transmissive element 20 is provided on one side surface of the front housing 11. The light transmissive element 20 may also be fixed to the front housing 11 by a fastener, or fixedly coupled, e.g., bonded, to the front housing 11, so that the light from outside the housing 10 may pass through the light transmissive element 20 to enter the receiving cavity within the housing 10. The light transmissive element 20 may be a light transmissive element made of materials such as glass, plastic or the like.

The cleaning mechanism further includes a cleaning element 30 pivotable about one end thereof and mounted to the housing 10. The cleaning element 30, when pivoting, frictionally interacts with a surface of the light transmissive element 20 that is away from the receiving cavity to clean the light transmissive element 20. As shown in the structure of FIG. 1, the cleaning element 30 may be a cleaning tool such as a wiper, a rag or the like. A first end 32 of the cleaning element 30 is rotatably mounted on a rotating shaft 41 of a driving component (not shown), and a second end 31 of the cleaning element 30 may rotate about the first end 32 of the cleaning element 30. In order to clean the light transmissive element 20 with the cleaning element 30, the cleaning element 30 is in frictional contact with the surface of the light transmissive element 20 that is away from the receiving cavity (i.e., the outer surface of the light transmissive element 20), such that the cleaning element 30 may pivot only in the range of the light transmissive element 20. The outer surface of the light transmissive element 20 may be cleaned by the friction between the cleaning element 30 and the light transmissive element 20.

The cleaning mechanism further includes a driving component (not shown) transmissively connected to the cleaning element 30 for driving the cleaning element 30. The driving component may be a motor such as a Direct Current (DC) motor, a stepper motor or the like.

The cleaning mechanism further includes a control unit installed within the receiving cavity and communicatively connected to the driving component for controlling the driving component.

When dirt is attached or adhered to the outer surface of the light transmissive element 20 such that light is blocked and cannot pass through the light transmissive element 20 to enter the receiving cavity, the control unit controls the driving component to drive the cleaning element 30 to pivot. When the cleaning element 30 is pivoting, it has a frictional contact with the outer surface of the light transmissive element 20 to clear the dirt attached or adhered to the outer surface of the light transmissive element 20 away, such that light may pass through the light transmissive element 20 to enter the receiving cavity. In this way, sensors may function normally.

The above cleaning mechanism is provided with the cleaning element 30, the driving component for driving the cleaning element 30 and the control unit. When dirt is attached or adhered to the outer surface of the light transmissive element 20, the cleaning mechanism 30 may clear the dirt away, such that signals, such as light, rays, light waves or electromagnetic waves, emitted from sensors may pass through the light transmissive element 20 normally and thus the sensors mounted within the housing 10 may function normally. In this way, the cleaning mechanism may clean the light transmissive element 20 with the cleaning element 30, such that the problem in the related art that a sensor may not function normally due to contamination of a sensor device by dirt such as dust may be solved.

In an exemplary implementation, the above cleaning mechanism may further include at least one jet head 50 mounted to the housing 10 and corresponding to the light transmissive element 20. Each jet head 50 has a jet hole 51 facing the light transmissive element 20. The cleaning mechanism having the structure shown in FIG. 1 includes two jet heads 50 mounted on the top of the housing 10. The specific number of jet heads 50 may be configured depending on actual situations. For example, one, two, three or more jet heads 50 may be provided. The specific position of the jet head(s) 50 may also be configured depending on actual situations. For example, the jet head(s) 50 may be arranged on the top and/or bottom and/or one side of the light transmissive element 20. When the cleaning mechanism includes a plurality of jet heads 50, the jet heads 50 may be connected with each other or may be provided independently. Each jet head 50 has a pipe connector 52 and at least one (e.g., one, two, three or more) jet hole 51 facing the light transmissive element 20. The specific number of the jet holes 51 and their specific positions may be configured depending on actual situations.

The jet head 50 is configured to jet a liquid and/or a gas onto the surface of the light transmissive element 20 that is away from the receiving cavity to clean the light transmissive element 20.

The above cleaning mechanism further includes at least one jet head 50 which may jet a liquid, a gas or a mixture thereof, with or without pressure, onto the surface of the light transmissive element 20. The liquid, gas or mixture thereof as jetted from the jet head onto the surface of the light transmissive element 20 may wash or purge the surface of the light transmissive element 20, such that dirt on the surface of the light transmissive element 20 may be cleaned away. With the jet head 50, the light transmissive element 20 may be further cleaned.

In some embodiments, the above cleaning mechanism may further include a liquid storage container and a gas storage container connected to the at least one jet head 50.

As the above cleaning mechanism further includes the liquid storage container and the gas storage container connected to the jet head 50, it may provide the jet head 50 with the liquid using the liquid storage container, with the gas using the gas storage container, or with the mixture of the liquid and the gas using both the liquid storage container and the gas storage container. As such, the jet head 50 may provide various schemes for cleaning the light transmissive element 20. The liquid storage container may be a container such as a water tank or a water jug. The gas storage container may be a container such as a gas tank or a pressure container.

Of course, when the above cleaning mechanism is mounted on an unmanned vehicle, the liquid or gas provided by the unmanned vehicle may be used. In this case, the cleaning mechanism may not be equipped with a liquid storage container or a gas storage container.

In order to facilitate control of the object to be jetted from the jet head 50, the at least one jet head 50 may be connected to the liquid storage container through a first pipe and a first solenoid valve provided on the first pipe.

The at least one jet head 50 may be connected to the gas storage container through a second pipe and a second solenoid valve provided on the second pipe. The first pipe and the second pipe may both be connected to the pipe connector 52 of the jet head 50.

The control unit is communicatively connected to the first solenoid valve and the second solenoid valve for controlling on/off of the first solenoid valve and the second solenoid valve.

As the control unit may control on/off of the first solenoid valve and the second solenoid valve, the above cleaning mechanism may control connection/disconnection between the jet head 50 and the liquid storage container by controlling the first solenoid valve and connection/disconnection between the jet head 50 and the gas storage container by controlling the second solenoid valve. That is, the object to be jetted from the jet head 50 may be selected by controlling on/off of the first solenoid valve and the second solenoid valve. For example, when the first solenoid valve and the second solenoid valve are both on, the jet head 50 is connected to both the liquid storage container and the gas storage container and may thus jet the mixture of the liquid and the gas. When the first solenoid valve is on and the second solenoid valve is off, the jet head 50 may jet the liquid, and when the first solenoid valve is off and the second solenoid valve is on, the jet head 50 may jet the gas.

Therefore, by providing the solenoid valves in the pipes, the object to be jetted from the jet head 50 may be selected, which facilitates control of the cleaning mechanism.

In order to improve control accuracy and avoid reverse flow of the liquid or gas, in the above cleaning mechanism, the first pipe may be further provided with a first check valve, and the second pipe may be provided with a second check valve.

In the above cleaning mechanism, by providing the first check valve on the first pipe, it is possible to prevent the liquid or gas from flowing reversely into the liquid storage container, and by providing the second check valve on the second pipe, it is possible to prevent the liquid or gas from flowing reversely into the gas storage container. In this way, the control accuracy may be improved and the safety and reliability of operations may be improved as well.

In order to further improve cleaning efficiency and cleanness, the above cleaning mechanism may further include a water pump provided on the first pipe between the first solenoid valve and the liquid storage container, and a gas pump connected to the gas storage container.

The control unit is communicatively connected to the water pump and the gas pump for controlling the water pump and the gas pump.

In particular, in use of the above cleaning mechanism, the control unit may control the jet head 50 by controlling the above first solenoid valve and second solenoid valve. Alternatively, the object to be jetted from the jet head 50 may be selected by controlling the water pump and the gas pump. Additionally, by adjusting the pressure of the water pump and/or the gas pump, the cleaning effect of the jet head 50 on the light transmissive element 20 may be adjusted, so as to meet the requirement on the cleanness of the light transmissive element 20.

Figure 4:
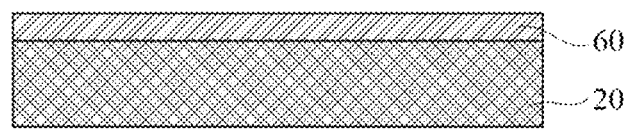
FIG. 4 is a schematic diagram showing a cross-sectional view of a light transmissive element and an electric heating film of the sensor device in FIG. 1 in direction C-C.

On the basis of the above embodiments, as shown in FIGS. 2, 3 and 4, the above cleaning mechanism may further include an electric heating film 60 mounted on the light transmissive element 20, and a gas valve 70 mounted to the housing 10.

The control unit is communicatively connected to the electric heating film 60 for controlling the electric heating film 60 to heat the light transmissive element 20.

The electric heating film 60 mounted on the light transmissive element 20 may heat the light transmissive element 20. When the surface of the light transmissive element 20 is frosted or when a liquid or mist is attached to the surface of the light transmissive element 20, the control unit may turn on the electric heating film 60 to heat the light transmissive element 20, such that the frost on the surface of the light transmissive element 20 may be removed or the liquid or mist may be evaporated and the transmittance of the light transmissive element 20 may in turn be improved. Additionally, in the above cleaning mechanism, the gas valve 70 mounted to the housing 10 may achieve a pressure balance between inside and outside of the housing 10, so as to avoid phenomena such as atomization or condensation occurring on the light transmissive element 20 due to changes in the pressure within the receiving cavity, which would otherwise affect normal operations of sensors.

In some embodiments, the electric heating film 60 may be provided on a surface of the light transmissive element 20 that is close to the receiving cavity. When the electric heating film 60 blocks transmission of light, holes may be provided on the electric heating film 60 so as to reduce the blocking effect of the electric heating film 60 on the light.

Additionally, in order to ensure that the respective components within the housing 10 can operate normally, when electrical elements within the housing 10 are electrically connected to devices external to the housing 10 via a cable, a waterproof connector 12 may be provided on the housing 10, such that the cable may provide a through-wall connection to the external devices via the waterproof connector 12, thereby preventing water from entering the housing 10 due to its low sealing performance and affecting normal operations of the respective components. In addition, in order to improve the sealing performance of the housing 10, a waterproof housing may be used as the housing 10, and a sealing member such as a sealing ring may be provided at a hole through the housing 10 to improve the airtightness of the receiving cavity of the housing 10 with respect to the outside of the housing 10. When the housing 10 includes the front housing 11 and the rear housing 12, a gasket may be provided between the front housing 11 and the rear housing 12.

The above control unit may be a control element such as a Single Chip Microcomputer (SCM), a Printed Circuit Board (PCB) or a controller.

The above cleaning mechanism is provided with the cleaning element 30, the jet head 50 and the electric heating film 60. Accordingly, when the cleaning mechanism is operating, there may be several cleaning schemes as follows:

Scheme 1: The cleaning element 30 in the cleaning mechanism operates independently as driven by the driving component under control of the control unit, to clean the outer surface of the light transmissive element 20 using only the cleaning element 30.

Scheme 2: The jet head 50 in the cleaning mechanism operates independently under control of the control unit, to clean the light transmissive element 20 using the liquid, gas or mixture thereof as jetted from the jet hole 51 of the jet head 50.

Scheme 3: The electric heating film 60 in the cleaning mechanism operates independently under control of the control unit, to heat the light transmissive element 20, so as to perform operations such as defrosting, demisting or drying on the light transmissive element 20, thereby cleaning the light transmissive element 20.

Scheme 4: The cleaning element 30 and the jet head 50 in the cleaning mechanism operate jointly under control of the control unit, to clean the light transmissive element 20 using the liquid, gas or mixture thereof as jetted from the jet hole 51 of the jet head 50, while cleaning the light transmissive element 20 using the cleaning element 30. With such joint cleaning scheme, the light transmissive element 20 may be cleaned thoroughly.

Scheme 5: The cleaning element 30 and the electric heating film 60 in the cleaning mechanism operate jointly under control of the control unit, to clean the light transmissive element 20 using both the cleaning element 30 and the electric heating film 60.

Scheme 6: The jet head 50 and the electric heating film 60 in the cleaning mechanism operate jointly under control of the control unit. The light transmissive element 20 may be cleaned first using the liquid, gas or mixture thereof as jetted from the jet hole 51 of the jet head 50 and then heated and cleaned by the electric heating film 60.

Scheme 7: The cleaning element 30, the jet head 50 and the electric heating film 60 in the cleaning mechanism clean the light transmissive element 20 thoroughly under control of the control unit.

When the above cleaning mechanism cleans the light transmissive element 20 using any of the above cleaning scheme, the order in which the cleaning element 30, the jet head 50 and the electric heating film 60 operate is not limited to those described above. Rather, the order may be configured depending on the contamination status of the light transmissive element 20, as long as it may meet the requirement on cleanness of the light transmissive element 20 using the above cleaning schemes.

According to some embodiments of the present disclosure, a sensor device 1 is also provided. The sensor device 1 includes the cleaning mechanism according to any of the above embodiments and a sensor provided within the housing 10 of the cleaning mechanism. The sensor may be provided at a position facing the light transmissive element 20 within the receiving cavity. The above sensor may be any of various sensors as actually required, such as a camera, a high-definition camera, an infrared camera, a ranging sensor, a displacement sensor, a position sensor or a positioning sensor.

Further, according to some embodiments of the present disclosure, an unmanned vehicle is provided. The unmanned vehicle includes at least one sensor device 1 according to any of the above embodiments.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A vehicle, comprising:
   a sensor configured to perform a sensing operation by emitting a signal to pass through a light transmissive element disposed in the vehicle;
   a cleaning structure configured to perform a cleaning operation to clean the light transmissive element and including at least one of: (1) a cleaning element in contact with the light transmissive element and configured to clean the light transmissive element, (2) an electric heating element mounted on the light transmissive element and configured to heat the light transmissive element, or (3) a jet head configured to jet a liquid or a gas onto the light transmissive element; and
   a controller in communication with the cleaning structure and configured to clean the light transmissive element by operating at least one of the cleaning element, the electric heating element, or the jet head.

2. The vehicle of claim 1, wherein the controller is configured to operate the cleaning element, the electric heating element, or the jet head such that the cleaning element, the electric heating element, or the jet head independently operates based on a control of the controller.

3. The vehicle of claim 1, wherein the controller is configured to jointly operate at least two of the cleaning element, the electric heating element, or the jet head based on a control of the controller.

4. The vehicle of claim 1, wherein the sensor is located at a position facing the light transmissive element.

5. The vehicle of claim 1, wherein the sensor is a camera, a high-definition camera, an infrared camera, a ranging sensor, a displacement sensor, a position sensor or a positioning sensor.

6. The vehicle of claim 1, wherein the controller is provided as a Single Chip Microcomputer (SCM) or a Printed Circuit Board (PCB).

7. The vehicle of claim 1, further comprising a driving component communicatively connected to the cleaning element and the controller and configured to drive the cleaning element based on a control of the controller.

8. The vehicle of claim 7, wherein the cleaning element has a first end rotatably mounted on a rotating shaft of the driving component and a second end rotating about the first end of the cleaning element.

9. The vehicle of claim 1, wherein the light transmissive element is cleaned by a friction between the cleaning element and the light transmissive element.

10. The vehicle of claim 1, wherein the light transmissive element includes glass or plastic.

11. A vehicle, comprising:
    a light transmissive element having a surface through which a signal associated with an environment surrounding the vehicle passes through;
    a cleaning structure configured to clean the surface of the light transmissive element; and a controller configured to control the cleaning structure to clean the surface of the light transmissive element in response to detecting a contamination of the surface of the light transmissive element, and wherein the light transmissive element, the cleaning structure, and the controller are disposed in a housing disposed within the vehicle.

12. The vehicle of claim 11, wherein the cleaning structure includes a cleaning element configured to clean the light transmissive element by a friction between the cleaning element and the light transmissive element.

13. The vehicle of claim 12, wherein the cleaning structure further includes: at least one of:
an electric heating element mounted on the surface of the light transmissive element and configured to heat the light transmissive element, or
a jet head configured to jet a liquid or a gas onto the surface of the light transmissive element.

14. The vehicle of claim 13, wherein the controller is configured to individually control an operation of the cleaning element, the electric heating element, or the jet head.

15. The vehicle of claim 13, wherein the controller is configured to jointly control operations of at least two of the cleaning element, the electric heating element, and the jet head.

16. The vehicle of claim 13, wherein the jet head is arranged on a top, bottom, or a side of the light transmissive element.

17. The vehicle of claim 13, further comprising at least one of:
a liquid storage container connected to the jet head and configured to provide the jet head with liquid; or
a gas storage container connected to the jet head and configured to provide the jet head with gas.

18. The vehicle of claim 17, wherein the jet head is connected with the liquid storage container through a first pipe and/or wherein the jet head is connected with the gas storage container through a second pipe.

19. The vehicle of claim 18, wherein at least one of the first pipe and the second pipe comprises a check valve configured to prevent the liquid or the gas from flowing reversely into the liquid storage container or the gas storage container.

20. The vehicle of claim 11, further comprising: a gas valve configured to achieve a pressure balance between inside and outside of the housing.

* * * * *